US010173826B2

(12) United States Patent
Sexton et al.

(10) Patent No.: US 10,173,826 B2
(45) Date of Patent: Jan. 8, 2019

(54) VENTABLE STORAGE CONTAINER AND METHOD OF USE

(71) Applicant: RUBBERMAID INCORPORATED, Huntersville, NC (US)

(72) Inventors: Joseph Michael Sexton, Roswell, GA (US); Evan Allen Fulford, Portage, MI (US); Gianna Lint, Cornelius, NC (US)

(73) Assignee: RUBBERMAID INCORPORATED, Huntersville, NC (US)

( * ) Notice: Subject to any disclaimer, the term of this patent is extended or adjusted under 35 U.S.C. 154(b) by 68 days.

(21) Appl. No.: 15/154,316

(22) Filed: May 13, 2016

(65) Prior Publication Data

US 2016/0332785 A1 Nov. 17, 2016

Related U.S. Application Data

(60) Provisional application No. 62/162,551, filed on May 15, 2015.

(51) Int. Cl.
*B65D 81/34* (2006.01)
*B65D 45/18* (2006.01)
(Continued)

(52) U.S. Cl.
CPC ............ *B65D 81/3453* (2013.01); *A23L 5/34* (2016.08); *B65B 7/2842* (2013.01); *B65B 25/22* (2013.01);
(Continued)

(58) Field of Classification Search
CPC ........................... B65D 81/3453; B65D 45/20; B65D 2205/00; B65D 53/02; B65D 45/18;
(Continued)

(56) References Cited

U.S. PATENT DOCUMENTS 3,817,419 A 6/1974 Moller et al.
6,305,546 B1 10/2001 Saunders et al.
(Continued)

OTHER PUBLICATIONS

Pyrex No Leak Lid Rectangular Storage Container. Advertisement [online]. Sears Holding Corporation, 2016 [retrieved on Apr. 27, 2016]. Retrieved from the Internet: <URL: http://www.sears.com/pyrex-no-leak-lid-rectangular-storage-container/p-00860355000P.

*Primary Examiner* — Jeffrey Allen
*Assistant Examiner* — Jennifer Castriotta
(74) *Attorney, Agent, or Firm* — Marshall, Gerstein & Borun LLP

(57) ABSTRACT

A storage container for food and other items and a method of venting a storage container. The storage container may include a container body and a removable lid. The removable lid may include a flexible sealing lip that traverses the perimeter of a rigid central cover portion. At least one venting aperture may extend through the rigid central cover portion. Additionally, the storage container may include a latch moveable between a latched position and an unlatched position. The latch may include a gripping portion configured to grip a peripheral rim of the container body and a sealing portion configured to cover the venting aperture when the latch occupies the latched position. When the latch occupies the unlatched position, the sealing portion may uncover the venting aperture to permit venting of steam and other gases from within the storage container.

20 Claims, 6 Drawing Sheets

(51) Int. Cl.
  *B65B 25/22* (2006.01)
  *B65B 7/28* (2006.01)
  *B65D 51/16* (2006.01)
  *B65D 53/02* (2006.01)
  *B65D 45/20* (2006.01)
  *A23L 5/30* (2016.01)

(52) U.S. Cl.
  CPC ............. *B65D 45/18* (2013.01); *B65D 45/20* (2013.01); *B65D 51/1633* (2013.01); *B65D 51/1672* (2013.01); *B65D 51/1683* (2013.01); *B65D 53/02* (2013.01)

(58) Field of Classification Search
  CPC ........................ B65D 51/1683; B65D 51/1672; B65D 51/16; B65D 51/1633; B65B 7/2842; B65B 25/22
  See application file for complete search history.

(56) References Cited

U.S. PATENT DOCUMENTS

| | | | |
|---|---|---|---|
| 6,364,152 | B1 | 4/2002 | Poslinski et al. |
| 6,779,681 | B2 | 8/2004 | Doerfler et al. |
| 6,789,692 | B2 | 9/2004 | Prezelin |
| 7,090,089 | B2 | 8/2006 | Lown et al. |
| 8,534,492 | B2 | 9/2013 | Smyers et al. |
| 8,662,334 | B2 | 3/2014 | Turvey et al. |
| 8,678,230 | B2 | 3/2014 | Smyers |
| D763,629 | S * | 8/2016 | Swartz .......................... D7/629 |
| 2002/0148846 | A1 | 10/2002 | Luburic |
| 2003/0010783 | A1* | 1/2003 | Prezelin ................ B65D 45/20 220/324 |
| 2004/0232026 | A1 | 11/2004 | Goeking et al. |
| 2006/0027588 | A1 | 2/2006 | Mackovic-Basic et al. |
| 2010/0147846 | A1* | 6/2010 | Soibel ................ B65D 43/0212 220/202 |
| 2012/0267369 | A1 | 10/2012 | Duvigneau |

\* cited by examiner

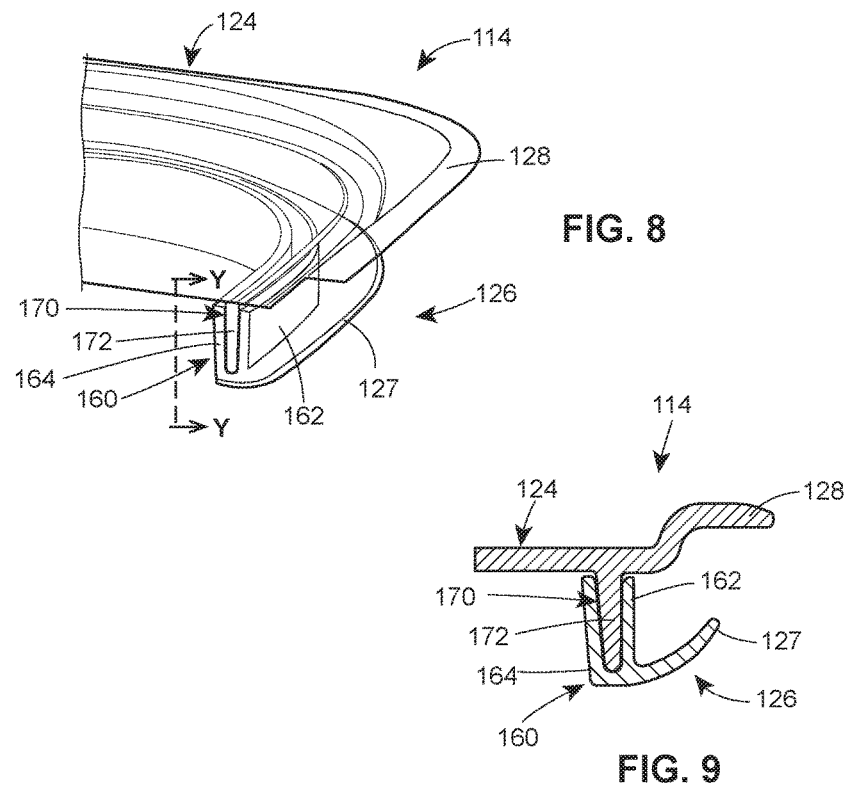
FIG. 8
FIG. 9
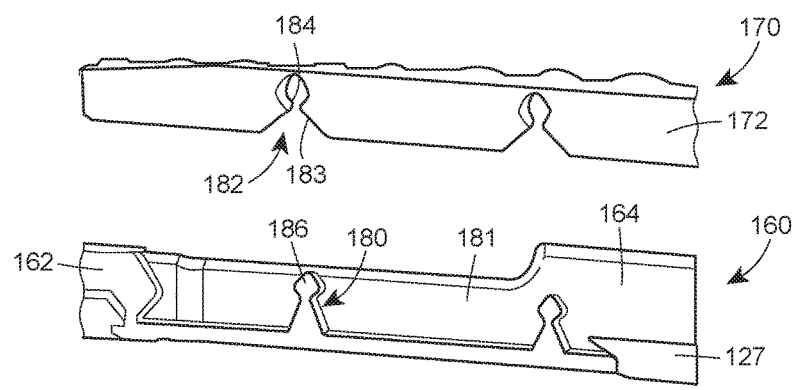
FIG. 10

VENTABLE STORAGE CONTAINER AND METHOD OF USE

CROSS REFERENCE TO RELATED APPLICATION

The priority benefit of U.S. Provisional Patent Application No. 62/162,551, filed May 15, 2015, is claimed, and the entire contents thereof are expressly incorporated herein by reference.

FIELD OF DISCLOSURE

The present disclosure generally relates to storage containers and, more particularly, to storage containers incorporating various features to attach and detach a container lid and vent gases from an interior of the storage container.

BACKGROUND

Many food storage containers include a container body covered by a removable lid. Generally, an air tight and/or leak-proof seal between the removable lid and the container body is preferred to maintain freshness of the food within the storage container. Some storage containers incorporate a wiper seal for this purpose. The wiper seal typically is disposed about a perimeter of the removable lid and pushes outwardly against an inner surface of a sidewall of the container body. While the wiper seal may be effective in providing an air tight seal, it does not provide a secure connection between the removable lid and the container body, which can be problematic if the storage container is turned sideways, upside down, or dropped. Furthermore, a wiper seal may build up air pressure inside the storage container as the removable lid is pushed onto the container body, which can make it cumbersome to properly seal the removable lid to the container body.

Another challenge with the wiper seals, and seals in general, is that steam released from the food inside the storage container during cooking or heating (e.g., microwave heating) can result in a significant rise in pressure inside the storage container, that is if the user chooses to keep the lid attached to the container body during cooking or heating to prevent splattering of the heat food. The steam build up can damage the storage container and potentially burn the hand of the user if the steam is released in a burst upon removal of the lid. While some existing storage containers incorporate one or more vents for releasing steam, these vents are typically unintuitive, and in some cases, do not allow continuous venting during cooking since they are biased to a closed position. Furthermore, existing vents typically require relatively complex sealing mechanisms, which may require both hands to operate because, for example, they require horizontal or lateral movement.

The present disclosure sets forth storage containers, and methods of their use, embodying advantageous alternatives to existing storage containers and methods, and that may address one or more of the challenges or needs mentioned above.

SUMMARY

One aspect of the disclosure provides a storage container including a container body, a removable lid, a first venting aperture, and a first latch moveable between a latched position and an unlatched position. The container body may include a bottom wall and a sidewall connected to the bottom wall. The sidewall may project upwardly from the bottom wall and terminate at a peripheral rim. The removable lid may include a rigid central cover portion and a flexible sealing lip traversing a perimeter of the rigid central cover portion. The first venting aperture may extend through the rigid central cover portion. The flexible sealing lip may be configured to sealingly engage at least one of the sidewall or the peripheral rim of the container body. The first latch may include a gripping portion and a sealing portion. The gripping portion may be configured to grip the peripheral rim of the container body and removably secure the removable lid to the container body when the first latch occupies the latched position. The sealing portion may be configured to cover the first venting aperture when the first latch occupies the latched position and uncover the first venting aperture when the first latch occupies the unlatched position.

Another aspect of the present disclosure provides a method for venting a storage container. The method may include: (a) filling a container body of the storage container with food, the container body including a bottom wall and a sidewall connected to the bottom wall, with the sidewall projecting upwardly from the bottom wall and terminating at a peripheral rim; (b) covering the container body with a removable lid; (c) rotating a latch hinged to the removable lid in a first rotational direction to cover a venting aperture extending through the removable lid and secure the latch to the peripheral rim of the container body; and (d) rotating the latch in a second rotational direction to uncover the venting aperture and vent an interior of the container body to the atmosphere.

BRIEF DESCRIPTION OF THE DRAWINGS

It is believed that the disclosure will be more fully understood from the following description taken in conjunction with the accompanying drawings. Some of the figures may have been simplified by the omission of selected elements for the purpose of more clearly showing other elements. Such omissions of elements in some figures are not necessarily indicative of the presence or absence of particular elements in any of the exemplary embodiments, except as may be explicitly delineated in the corresponding written description. None of the drawings are necessarily to scale.

FIG. 8 is a cutaway perspective view of another embodiment of a removable lid in accordance with principles of the present disclosure;

FIG. 9 is a cross-sectional view taken along line Y-Y of FIG. 8;

FIG. 10 is a cutaway perspective view of the removable lid of FIG. 8 prior to assembly;

DETAILED DESCRIPTION

In general, the present disclosure provides a storage container having a latch for securing a removable lid to a container body in a leak-proof manner. Moving the latch to secure the removable lid also may cause the latch to seal close a venting hole formed in the removable lid. By configuring the latch to secure the removable lid and seal close a venting aperture in a single motion, the design and use of the storage container may be simplified and more intuitive to consumers.

Figure 1:
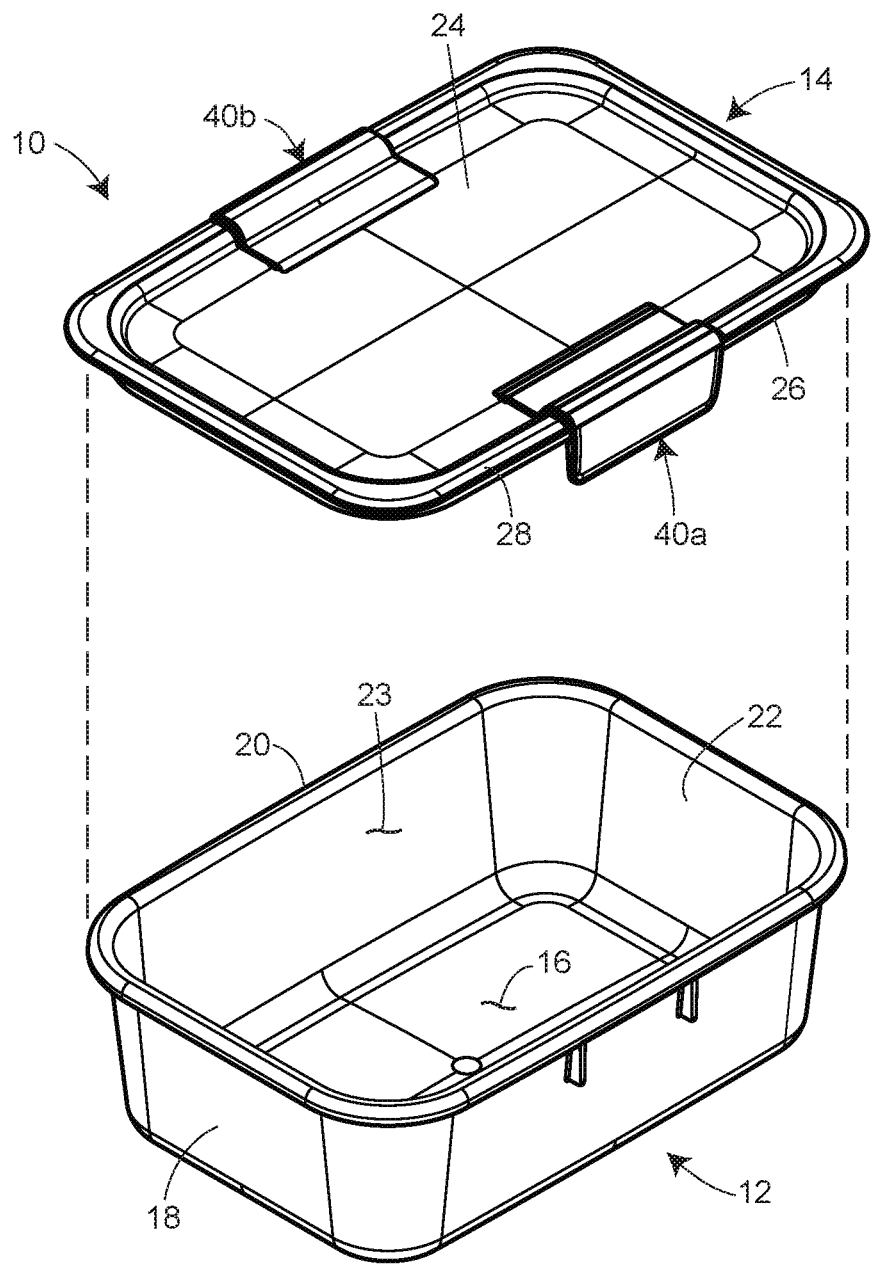
FIG. 1 is an exploded assembly view of one embodiment of a storage container constructed in accordance with principles of the present disclosure.

FIG. 1 is an exploded assembly view of one embodiment of a storage container 10 constructed in accordance with principles of the present disclosure. The storage container 10 includes a container body 12 and a removable lid 14. The container body 12 has a bottom wall 16 and a sidewall 18 connected to the bottom wall 16. The sidewall 18 projects upwardly from the bottom wall 16 and terminates at a peripheral rim 20. The peripheral rim 20 includes at least the uppermost surface of the container body 12. An interior cavity 22 for holding food, and other items, is defined by the bottom wall 16 and the sidewall 18. An inner surface 23 of the sidewall 18 faces the interior cavity 22. When viewed from above, the container body 12 may resemble a rectangle, square, circle, or any other suitable shape.

Figure 2:
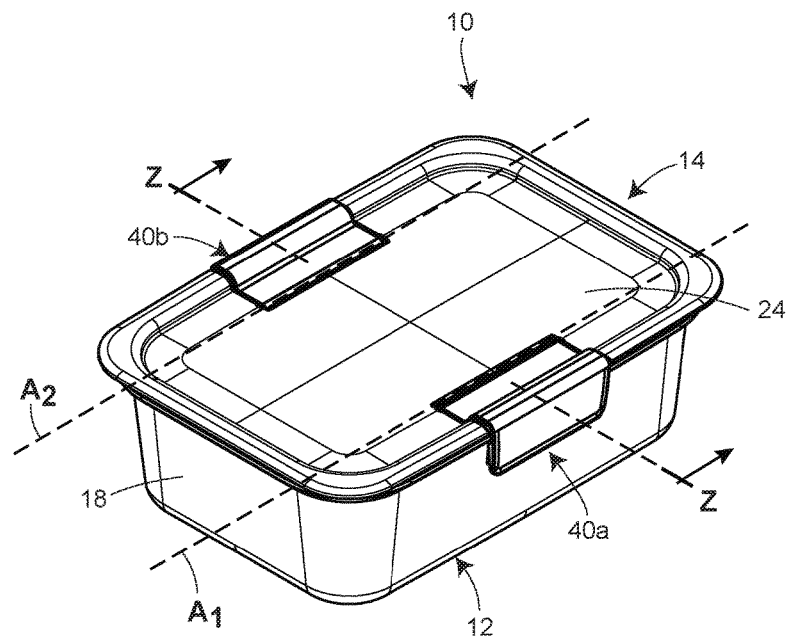
FIG. 2 is a perspective view of the storage container of FIG. 1 with the removable lid attached to the container body and with the latches arranged in their respective latched positions.

Referring to FIGS. 1 and 2, the removable lid 14 is sized and dimensioned to cover the open upper end of the container body 12. The removable lid 14 may include a rigid central cover portion 24 and a flexible sealing lip 26 traversing a perimeter of the rigid central cover portion 24. In some embodiments, the rigid central cover portion 24 may be made of a different material than the flexible sealing lip 26. For example, the rigid central cover portion 24 may be made of a rigid plastic such as polypropylene or Tritan™ plastic sold by Eastman, whereas the flexible sealing lip 26 may be made of a rubber material such as a thermoplastic elastomer. The terms "rigid" and "flexible" are intended to define the relative flexibility of the central cover portion 24 and the sealing lip 26, and are not intended to define a specific rigidity or flexibility of these components.

Figure 3:
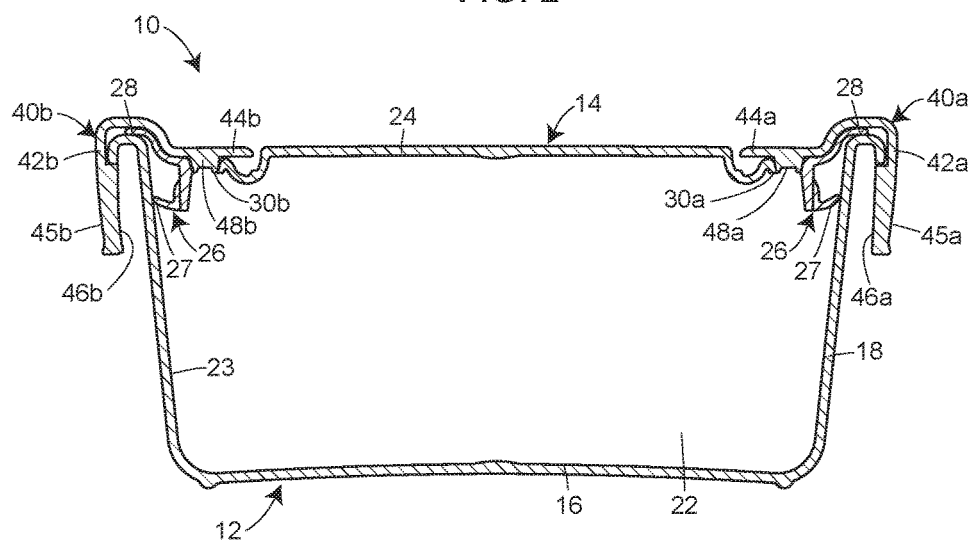
FIG. 3 depicts a cross-sectional view taken along line Z-Z of FIG. 2.

Looking to the cross-sectional view illustrated in FIG. 3, the flexible sealing lip 26 includes a wiper seal 27 that slidably and sealingly engages the inner surface 23 of the sidewall 18 as the removable lid 14 is pushed onto the container body 12. The flexible sealing lip 26 may be biased in the outward direction toward the inner surface 23 of the sidewall 18 such that the flexible sealing lip 26 pushes against and maintains contact with the inner surface 23 of the sidewall 18. In some embodiments, the flexible sealing lip 26 may be molded together with the rigid central cover portion 24 in a two-shot injection molding process such that the material of flexible sealing lip 26 bonds with the material of the rigid central cover portion 24.

In alternative embodiments (not illustrated), the flexible sealing lip 26 may include a compression seal disposed on an underside of an outer peripheral portion 28 of the removable lid 14 such that the flexible sealing lip 26 is compressed between the outer peripheral portion 28 of the removable lid 14 and the peripheral rim 20 of the container body 12 when the removable lid 14 is pushed onto the container body 12. In these embodiments, a seal may be formed between the flexible sealing lip 26 and the outer peripheral rim 20 of the container body 12. In still further alternative embodiments, the removable lid 14 may include both a wiper seal and a compression seal.

Referring back to the embodiment illustrated in FIG. 3, the flexible sealing lip 26 tends to increase air pressure inside the container body 12 as the removable lid 14 is pushed onto the container body 12. This is because air displaced by the removable lid 14 is trapped by the flexible sealing lip 26 in the interior cavity 22 of the container body 12. The increase in air pressure may resist downward movement of the removable lid 14, which can make it difficult for the user to attach the removable lid 14 to the container body 12.

Figure 4:
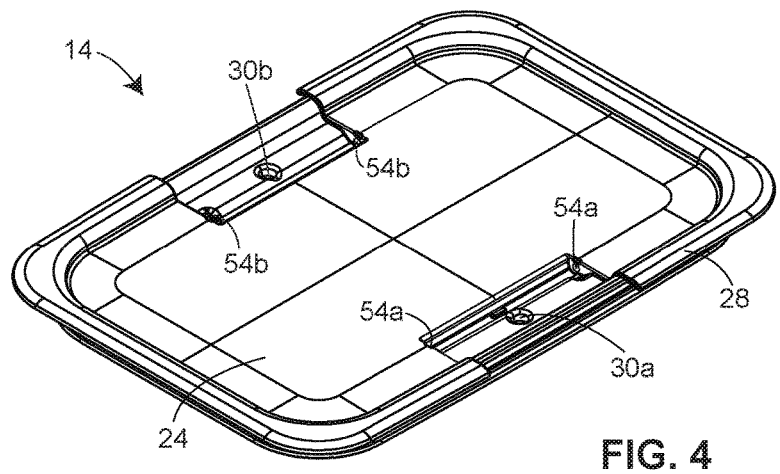
FIG. 4 illustrates a perspective of the removable lid of the storage container of FIG. 1, with its latches omitted.

To release air pressure from the interior cavity 22 of the container body 12 while the removable lid 14 is attached, one or more venting apertures (e.g., venting apertures 30a and 30b) may extend through the rigid central cover portion 24 of the removable lid, as illustrated in FIG. 4. The venting apertures 30a and 30b may also function to vent steam produced by cooking or heating food within the storage container 10, as discussed below in more detail. The shape of the venting aperture 30a and 30b may be circular (see FIG. 4), oval (see FIG. 7), square, rectangular, polygonal, or any other suitable shape.

Referring to FIGS. 1-3, two latches 40a and 40b may be arranged on opposite sides of the storage container 10, and each may be rotationally (e.g., pivotably) attached to an upper surface of the rigid central cover portion 24 of the removable lid 14. Each of the latches 40a and 40b may be moveable between a latched position (see latches 40a and 40b in FIGS. 2 and 3) and an unlatched positioned (see latch 40 in FIG. 7). Each of the latches 40a and 40b may include, respectively, a gripping portion 42a or 42b and a sealing portion 44a or 44b. The gripping portions 42a and 42b are each configured to grip the peripheral rim 20 of the container body 12 when the latches 40a and 40b occupy their respective latched positions. In some embodiments, each of the gripping portions 42a and 42b may form a snap fit with the peripheral rim 20 by including a depression having a slightly smaller width than the peripheral rim 20 so that it squeezes the peripheral rim 20.

Figure 5:
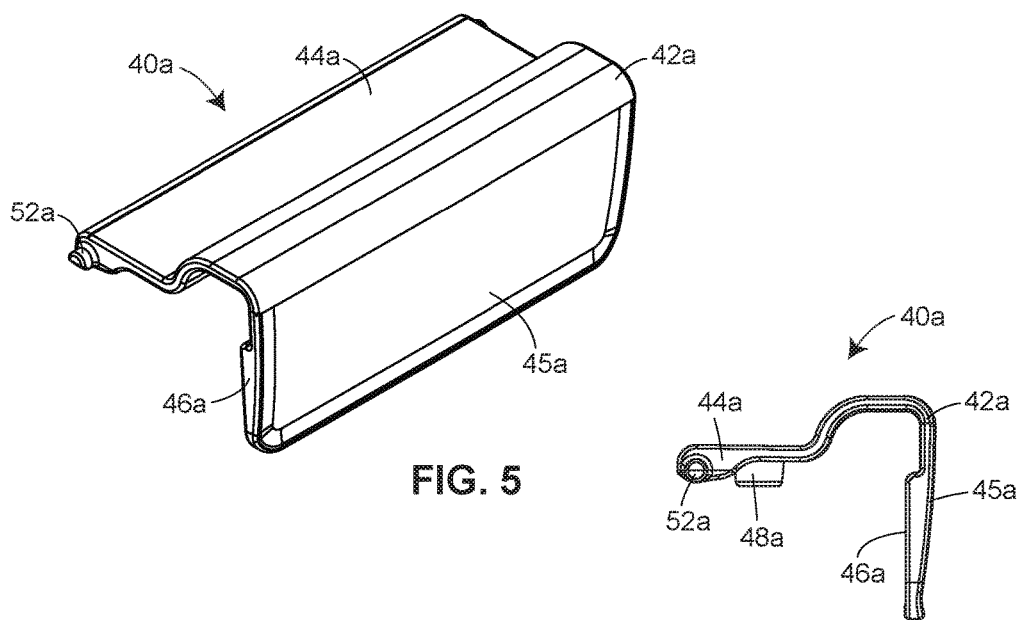
FIG. 5 illustrates a perspective view of one of the latches of the storage container of FIG. 1.
Figure 6:
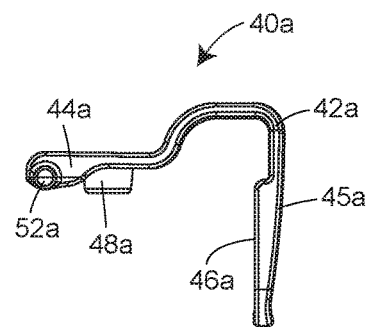
FIG. 6 is a side view of the latch shown in FIG. 5.

Referring to FIGS. 3, 5, and 6, each of the gripping portions 42a and 42b may include, respectively, a handle 45a or 45b and a locking tab 46a or 46b. When the latches 40a and 40b occupy their respective latched positions, the locking tabs 46a and 46b may protrude inwardly from their respective handles 45a and 45b and abut a downwardly facing lip of the peripheral rim 20. The latches 40a and 40b and/or the peripheral rim 20 may be elastically deformable so that a user can unlock the latches 40a and 40b from the peripheral rim 20 by slightly deforming the latches 40a and 40b and/or the peripheral rim 20, and thereby disengage the locking tabs 46a and 46b from the peripheral rim 20. Also, when the latches 40a and 40b occupy their respective latched positions, the handles 45a and 45b may extend in the downward direction in a spaced apart configuration relative to the sidewall 18 of the container body 12. Accordingly, a user can unlatch the latches 40a and 40b by slipping his or her finger(s) between the handles 45a and 45b and the sidewall 18 and pulling up on the handles 45a and 45b. This configuration of the handles 45a and 45b advantageously may allow a user to unlatch the latch 40a and the latch 40b with one hand.

In addition to securing the removable lid 14 to the container body 12, the latches 40a and 40b can be used to seal close the venting apertures 30a and 30b formed in the removable lid 14. When the latches 40a and 40b occupy their respective latched positions, the lower surface of the sealing portions 44a and 44b of each of the latches 40a and 40b may sealingly and flushly engage the upper surface of the removable lid 14, thereby covering the venting apertures 30a and 30b, respectively. When the latches 40a and 40b are rotated to their respective unlatched positions, the sealing portions 44a and 44b of the latches 40a and 40b may lift off of the removable lid 14, thereby uncovering the venting apertures 30a and 30b, respectively. In some embodiments, the venting aperture 30b may not be included so that the venting aperture 30a is the only venting aperture.

To enhance the ability of the latches 40a and 40b to seal close the venting apertures 30a and 30b, a sealing protrusion 48a or 48b may extend in the downward direction from each of the sealing portions 44a and 44b, as depicted in FIGS. 3 and 6. The sealing protrusions 48a and 48b may be sized and dimensioned to be inserted into the venting apertures 30a and 30b, respectively. An outer dimension (e.g., diameter) of each of the sealing protrusions 48a and 48b may be slightly larger than the inner dimension (e.g., diameter) their corresponding venting apertures 30a and 30b. Accordingly, the sealing protrusions 48a and 48b push outwardly against the inner wall of their corresponding venting apertures 30a and 30b, thereby providing an air tight seal. In some embodiments, the venting apertures 30a and 30b may extend through respective rubber portions of the removable lid 14. These rubber portions may be co-molded with the remainder of the removable lid 14. The sealing protrusions 48a and 48b may be made of a harder material (e.g., plastic) than the rubber portions, thereby enabling the sealing protrusions 48a and 48b to slightly deform the rubber portions during their insertion into the venting apertures 30a and 30b, which may create a tight seal between the sealing protrusions 48a and 48b and their corresponding venting apertures 30a and 30b.

Referring back to FIG. 2, each of the latches 40a and 40b may be rotatable, respectively, about a rotational axis $A_1$ or $A_2$. The rotational axis $A_1$ may be parallel to and offset inwardly from the portion of the peripheral rim 20 gripped by the latch 40a in its latched position. Similarly, the rotational axis $A_2$ may be parallel to and offset inwardly from the portion of the peripheral rim 20 gripped by the latch 40b in its latched position. Furthermore, the rotational axes $A_1$ and $A_2$ may be positioned above or level with the upper surface of the removable lid 14. Rotation of the latches 40a and 40b may be accomplished by a hinge between each of latches 40a and 40b and the removable lid 14. Each hinge may be formed by the combination of: (i) cylindrical protrusions 52a or 52b (see FIG. 5) which extend outwardly from opposite ends of each of the latches 40a and 40b, and (ii) grooves 54a and 54b formed in the upper surface of the removable lid 14. The grooves 54a and 54b may be sized and dimensioned to receive, respectively, the cylindrical protrusions 52a and 52b, and to retain the cylindrical protrusions 52a and 52b therein while the cylindrical protrusions 52a and 52b rotate. Additionally, the grooves 54a and 54b may define, respectively, the rotational axes $A_1$ and $A_2$ of the latches 40a and 40b. In alternative embodiments, instead of being rotationally connected to the removable lid 14, one or both of the latches 40a and 40b may be slidably attached to the removable lid 14.

While the storage container 10 of the present embodiment incorporates two latches, in other embodiments, the storage container 10 may include three, four, or more latches, or even include a single latch. Also, while the latches 40a and 40b of the storage container 10 are arranged along respective long sides of the storage container 10, in other embodiments, the latches 40a and 40b may be arranged along respective short sides of the storage container 10. Additionally, while the foregoing container body 12 and/or the rigid central cover portion 24 are disclosed as being made from a plastic material, the container body 12 and/or rigid central cover portion 24 may be made of any suitable material including, but not limited to, glass, metal (e.g., stainless steel), and/or a ceramic material. Furthermore, while the venting apertures 30a and 30b are described as being provided primarily for venting gases within the storage container 10, the venting apertures 30a and 30b may also serve other functions. For example, the venting apertures 30a and 30b may be used to pour liquid contents of the storage container 10 into another container.

Figure 7:
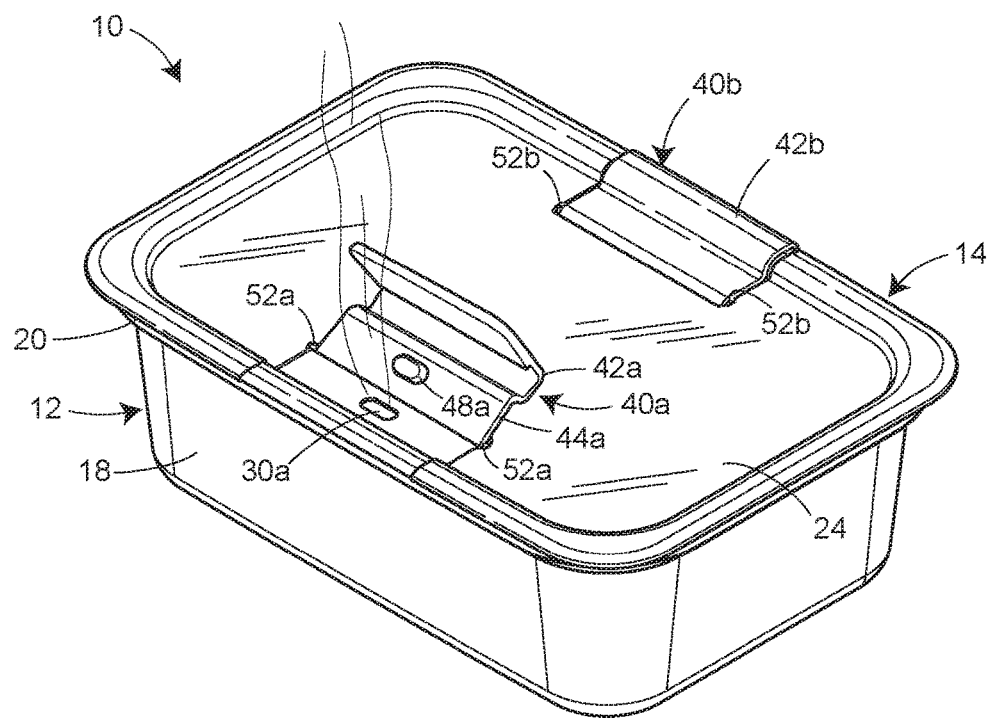
FIG. 7 is a perspective view of the storage container of FIG. 1 with the removable lid attached to the container body, and with one of the latches arranged in its latched position and the other one of the latches arranged in its unlatched position.

A method of using the storage container 10 will now be described with reference to FIGS. 1, 2, and 7. Initially, the interior cavity 22 of the container body 12 may be filled, partially or entirely, with food or other items. Next, a user may cover the open upper end of the container body 12 with the removable lid 14 by lowering the removable lid 14 onto the peripheral rim 20 of the container body 12. In embodiments where the flexible sealing lip 26 includes the wiper seal 27, the wiper seal 27 may slide along the inner surface 24 of the sidewall 18 as the removable lid 14 is attached to the container body 12. Also, at this stage, one or more of the latches 40a or 40b may be arranged in its unlatched position so that air displaced by the insertion of the flexible sealing lip 26 into the interior cavity 22 is vented through one or both of the venting apertures 30a and 30b. Since air is not trapped inside the container body 12 as the removable lid 14 is fitted onto the container body 12, air pressure does not build inside the container body 12 and resist downward movement of the removable lid 14 onto the container body 12. Accordingly, attaching the removable lid 14 to the container body 12, and achieving a proper seal between the flexible sealing lip 26 and the sidewall 16 and/or peripheral 20, may be less cumbersome for a user.

After the removable lid 14 has been placed on the peripheral rim 20 of the container body 12, the user may rotate each of the latches 40a and 40b from their respective unlatched positions to their respective latched positions. This may involve rotating the latch 40a clockwise, and rotating the latch 40b counterclockwise, until each latch grips the peripheral rim 20 of the container body 20 and covers their corresponding venting apertures 30a and 30b, as illustrated in FIG. 2. This step may involve slightly deforming the latches 40a and 40b so that their respective locking tabs 46a and 46b snap over and abut the downwardly facing lip of the peripheral rim 20, as seen in FIG. 3. After the latches 40a and 40b have been rotated to their respective latched positions, the interior cavity 22 of the container body 12 may be sealed, and the user may place the storage container 10 in storage (e.g., in a refrigerator). Rotating the latches 40a and 40b to their respective latched positions may be relatively intuitive for the user, and may be accomplished with one hand, since the final part of the latching movement may involve simply pushing the latches 40a and 40b in the downward direction.

Subsequently, for example, when a user desires to cook or warm the contents of the storage container 10, the user may rotate one or both of the latches 40*a* and 40*b* to their respective unlatched positions (see latch 40*a* in FIG. 7). This may involve rotating the latch 40*a* counterclockwise, or rotating the latch 40*b* clockwise, to release the latch 40*a* or the latch 40*b* from the peripheral rim 20 and uncover the venting aperture 30*a* or the venting aperture 30*b*.

Next, with one or both of the latches 40*a* and 40*b* in their unlatched positions, the food storage container 10 may be placed inside or on a cooking device (e.g., an oven, microwave, stove, grill, etc.) where the contents of the food storage container 10 can be cooked or warmed. Since one or both of the venting apertures 30*a* and 30*b* will be uncovered, steam and other gases produced by warming the food or other items inside the storage container during cooking or warming may be vented through one or both of the venting apertures 30*a* and 30*b*. Thus, a pressure build up inside the storage container 10 may be avoided. Additionally, since the removable lid 14 covers the container body 12 during cooking, the risk of food splattering the interior of the cooking device during cooking is reduced, if not altogether eliminated.

In alternative embodiments, the storage container 10 may be placed inside or on the cooking device with each of the latches 40*a* and 40*b* in its respective latched position. Subsequently, after cooking is complete, one or both of the latches 40*a* and 40*b* may be rotated to its unlatched position for venting steam and other gases produced and trapped inside the storage container 10 during cooking.

Referring now to FIGS. 8-10, illustrated is a removable lid 114 in accordance with another embodiment of the present disclosure. The removable lid 114 is similar to the removable lid 14 described above, except for the configuration of the flexible sealing lip 126 and its attachment to the rigid central cover portion 124. Elements of the removable lid 114 that correspond to the removable lid 14 are designated by the same reference numeral, incremented by 100. A description of many of these elements is abbreviated or even eliminated in the interest of brevity.

FIGS. 8 and 9 illustrate that the flexible sealing lip 126 includes a first connector member 160 configured to connect the flexible sealing lip 126 to an underside of the rigid central cover portion 124. In at least one embodiment, the first connector member 160 may be integrally formed with the wiper seal 127 such that the two components form a single, unitary structure made of the same material. As shown in FIGS. 8 and 9, the first connector member 160 may include a pair walls 162 and 164 defining a cavity therebetween. Each of the opposing walls 162 and 164 may be located inwardly of the wiper seal 127 and extend continuously in a loop that follows the outer periphery of the removable lid 114. Furthermore, each of the opposing walls 162 and 164 may extend upwardly from an inner end of the wiper seal 127 and terminate just below the underside of the rigid central cover portion 124.

Referring still to FIGS. 8 and 9, the flexible sealing lip 126 may be connected to the rigid central cover portion 124 by matingly engaging the first connector member 160 with a second connector member 170 integrally formed with the rigid central cover portion 124. The second connector member 170 may include a protrusion 172 which extends downwardly from the underside of the rigid central cover portion 124. The protrusion 172 be located inwardly of the wiper seal 127 and may extend continuously in a loop that follows the outer periphery of the removable lid 114. The protrusion 172 may be sized and dimensioned to be received by the cavity defined between the opposing walls 162 and 164 of the first connector member 160. The cavity may be slightly smaller than the protrusion 172 such that an interference-fit, snap-fit, and/or press-fit connection is formed between the protrusion 172 and the opposing walls 162 and 164. So configured, the opposing walls 162 and 164 may grip the protrusion 172, thereby securing the flexible sealing lip 126 to the rigid central cover portion 124. The mechanical gripping force provided by the pair opposing walls 162 and 164 reduces, or eliminates, the need for the material of the flexible sealing lip 126 to chemically bond with the material of rigid central cover portion 124. Therefore, there may be more flexibility in choosing the material for the flexible sealing lip 126 and/or the rigid central cover portion 124.

To further strengthen the connection between the first connector member 160 and the second connector member 170, one or more interlocking features may be included. Along these lines, as shown in FIG. 10, an inner surface 181 of the wall 164 may include one or more inwardly protruding keys 180 to be received by one or more corresponding slots 182 formed in the protrusion 172. Each of the slots 182 may include a tapered mouth portion 183 and an undercut 184 configured to grip a bulbous head portion 186 of each of the keys 170. The tapered mouth portion 183 may facilitate insertion of the bulbous head portion 186, whereas the undercut 184 may make it difficult to remove the bulbous head portion 186 from the slot 182. Accordingly, less force may be required to insert the key 180 into the slot 182 than to remove the key 180 from the slot 182. Additionally, or alternatively, inwardly protruding keys (not illustrated) may be formed on an inner surface of the wall 162.

Figure 11:
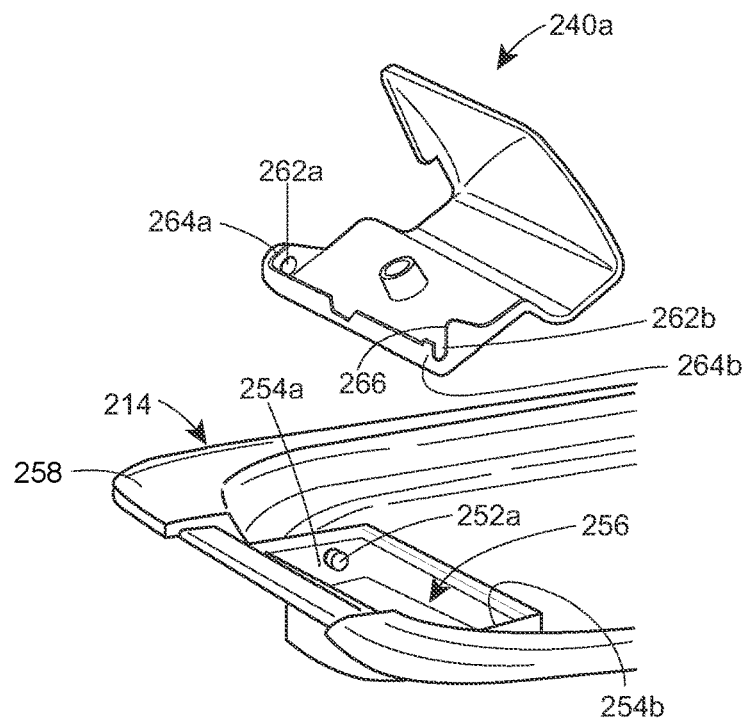
FIG. 11 is a cutaway perspective view of another embodiment of a latch and a removable lid prior to assembly in accordance with principles of the present disclosure.

Turning to FIG. 11, a latch 240*a* and a removable lid 214 are illustrated in accordance with another embodiment of the present disclosure. The latch 240*a* and the removable lid 214 are similar to the latch 40*a* and the removable lid 14 described above, except for the manner in which the latch 240*a* is connected to the removable lid 214. Elements of the latch 240*a* and the removable lid 214 which are similar to the latch 40*a* and the removable lid 14 are designated by the same reference numeral, incremented by 200. A description of many of these elements is abbreviated or even eliminated in the interest of brevity.

Referring still to FIG. 11, the latch 240*a* may be rotationally connected to the removable lid 214 by a hinge. In at least one embodiment, the hinge may be formed by the combination of: (i) a cylindrical protrusion or pin 252*a* and a cylindrical protrusion or pin 252*b* (hidden from view in FIG. 11) which extend inwardly from opposing sidewalls 254*a* and 254*b* of a recess 256 formed in an upper surface 258 of the removable lid 214; and (ii) openings 262*a* and 262*b* formed in opposite ends of the latch 240*a*. The openings 262*a* and 262*b* may be sized and dimensioned to receive, respectively, the cylindrical protrusions 252*a* and 252*b*, and to retain the cylindrical protrusions 252*a* and 252*b* therein while the cylindrical protrusions 252*a* and 252*b* rotate. As shown in FIG. 11, the opening 262*a* may be defined by circular rim 264*a* forming a complete loop, whereas the opening 262*b* may be defined by a c-shaped rim 264*b* having a slit 266 allowing the cylindrical protrusion 252*b* to be inserted into the opening 262*b*. The hinge formed by the combination of the cylindrical protrusions 252*a* and 252*b* into the openings 262*a* and 262*b* provides a relatively strong connection between the latch 240*a* and the removable lid 214, thereby allowing a user to remove the removable lid 214 from the container body (not illustrated in FIG. 11) by pulling upward on the latch 240*a* after the user has rotated the latch 240*a* to unlock the removable lid 214 from the container body. Although not illustrated in FIG. 11, a second latch, configured in a manner similar to the latch 240a, may be rotationally connected to a side of the removable lid 214 opposite to the latch 240a.

Figure 12:
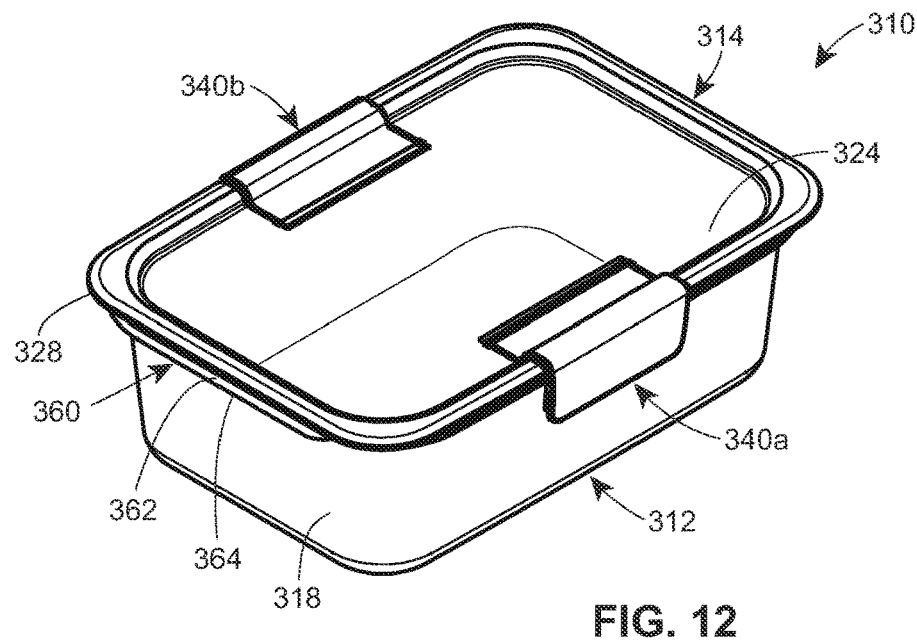
FIG. 12 illustrates a perspective view of another embodiment of a storage container in accordance with principles of the present disclosure.

FIG. 12 illustrates a storage container 310 in accordance with yet another embodiment of the present disclosure. The storage container 310 is similar to the storage container 10 described above, except for the addition of a handle 360. Elements of the storage container 310 which are similar to the storage container 10 are designated by the same reference numeral, incremented by 300. For the sake of brevity, a description of many of these elements is abbreviated or even eliminated. Furthermore, the storage container 310 may be configured to incorporate the removable lid 114, the latch 240a, and/or the removable lid 214 described above in connection with FIGS. 8-11.

As illustrated in FIG. 12, the handle 360 may be formed by a lip 362 that extends outwardly from the peripheral rim 320 of the container body 312. An outer edge 364 of the lip 362 may be positioned outwardly of the outer peripheral portion 328 of the removable lid 314 so that the outer edge 364 is not covered by the outer peripheral portion 328 of the removable lid 314. Accordingly, the handle 360 may allow a user to grip and hold down the container body 320 when removing the removable lid 314 from the container body 320. In at least one embodiment, the handle 360 may be integrally formed with the container body 320 such that the two components form a single, unitary structure made of the same material. While FIG. 12 illustrates a single handle extending from a short side of the container body 320 not having one of the latches 340a and 340b, alternative embodiments can be arranged differently, with handles extending from each of the four sides of the container body 320, or only the short sides of the container body 320, or any other combination of sides of the container body 320.

From the foregoing, it can been seen that the present disclosure advantageously provides an improved storage container and method of use. By incorporating a latch that, in a single motion, can seal a venting aperture and secure a removable lid to a container body, sealing the storage container may be relatively intuitive for a consumer and the number of components needed for sealing the container may be minimized. Furthermore, since the vent may be uncovered by rotating the latch to its unlatched position, the latch enables continuous venting of the interior of the storage container during cooking and microwaving. Still further, combining the latch with a wiper seal can provide a robust air tight and leak-proof seal between the removable lid and the container body, and yet still allows for optional venting.

While the present disclosure has been described with respect to certain embodiments, it will be understood that variations may be made thereto that are still within the scope of the appended claims.

What is claimed is:

1. A storage container comprising:
   a container body including a bottom wall and a sidewall connected to the bottom wall, the sidewall projecting upwardly from the bottom wall and terminating at a peripheral rim;
   a removable lid including a rigid central cover portion and a flexible sealing lip traversing a perimeter of the rigid central cover portion, wherein the flexible sealing lip is configured to sealingly engage at least one of the sidewall or the peripheral rim of the container body;
   a first venting aperture extending through the rigid central cover portion of the removable lid;
   a first latch movable between a latched position and an unlatched position; and
   the first latch including a gripping portion and a sealing portion, wherein the gripping portion is configured to grip the container body and removably secure the removable lid to the container body when the first latch occupies the latched position, and wherein the sealing portion is configured to cover the first venting aperture when the first latch occupies the latched position and uncover the first venting aperture when the first latch occupies the unlatched position,
   wherein the sealing portion of the first latch includes a sealing protrusion sized and dimensioned to be inserted into, and sealingly close, the first venting aperture when the first latch occupies the latched position.

2. The storage container of claim 1, wherein the first latch is rotationally connected to the removable lid.

3. The storage container of claim 2, wherein the first latch is configured to rotate about a rotational axis offset inwardly from the peripheral rim of the container body when the removable lid is secured to the container body.

4. The storage container of claim 1, further comprising:
   a second latch movable between a latched position and an unlatched position;
   a second venting aperture extending through the rigid central cover portion of the removable lid;
   the second latch including a gripping portion and a sealing portion, wherein the gripping portion is configured to grip the peripheral rim of the container body and removably secure the removable lid to the container body when the second latch occupies the latched position, wherein the sealing portion is configured to cover and seal close the second venting aperture when the latch occupies the latched position and uncover the venting aperture when the latch occupies the unlatched position; and
   wherein the first and second latches are arranged on opposite sides of the storage container.

5. The storage container of claim 1, wherein the gripping portion of the first latch is configured to snap over the peripheral rim of the container body to removably secure the removable lid to the container body when the first latch occupies the latched position.

6. The storage container of claim 1, wherein the flexible sealing lip includes a wiper seal configured to slidably and sealingly engage an inner surface of the sidewall.

7. The storage container of claim 1, wherein an outer peripheral portion of the removable lid is clamped between the gripping portion of the first latch and the peripheral rim of the container body when the first latch occupies the latched position.

8. The storage container of claim 7, wherein the flexible sealing lip includes a compression seal disposed on an underside of the outer peripheral portion of the removable lid such that the compression seal is clamped between the outer peripheral portion of the removable lid and the peripheral rim of the container body when the first latch occupies the latched position.

9. The storage container of claim 1, wherein the flexible sealing lip includes a first connector member and the rigid central cover portion includes a second connector member, wherein the first and second connector members matingly engage each other.

10. The storage container of claim 9, wherein the first connector member includes a cavity sized and dimensioned to receive the second connector member.

11. The storage container of claim 1, wherein the first latch includes an opening receiving a pin extending from the removable lid to rotationally connect the first latch and the removable lid.

12. The storage container of claim 1, further comprising a handle extending outwardly from the peripheral rim of the container body and being disposed outwardly of the removable lid.

13. A method for venting a storage container, the method comprising:
    filling a container body of the storage container with food, the container body including a bottom wall and a sidewall connected to the bottom wall, the sidewall projecting upward from the bottom wall and terminating at a peripheral rim;
    covering the container body with a removable lid, the removable lid including a rigid central cover portion and a flexible sealing lip traversing a perimeter of the rigid central cover portion, wherein the flexible sealing lip is configured to sealingly engage at least one of the sidewall or the peripheral rim of the container body;
    rotating a latch hinged to the removable lid in a first rotational direction to a latched position in which (i) a sealing portion of the latch covers a venting aperture extending through the rigid central cover portion of the removable lid, and (ii) a gripping portion of the latch grips the container body to secure the latch to the peripheral rim of the container body, wherein the sealing portion of the first latch includes a sealing protrusion sized and dimensioned to be inserted into, and sealingly close, the venting aperture when the latch occupies the latched position; and
    rotating the latch in a second rotational direction to an unlatched position in which the sealing portion of the latch uncovers the venting aperture and vents an interior cavity of the container body to the atmosphere.

14. The method of claim 13, further comprising placing the storage container in a microwave to heat the food within the storage container.

15. The method of claim 14, wherein the latch is rotated in the second rotational direction to uncover the venting aperture and vent the interior of the container body to the atmosphere before heating the food in the microwave.

16. The method of claim 14, wherein the latch is rotated in the second rotational direction to uncover the venting aperture and vent the interior of the container body to the atmosphere after heating the food in the microwave.

17. The method of claim 13, wherein covering the container body with the removable lid comprises sliding a wiper seal connected to the removable lid along an inner surface of the sidewall of the container body.

18. A storage container comprising:
    a container body including a bottom wall and a sidewall connected to the bottom wall, the sidewall projecting upwardly from the bottom wall and terminating at a peripheral rim;
    a removable lid including a rigid central cover portion and a flexible sealing lip traversing a perimeter of the rigid central cover portion, wherein the flexible sealing lip is configured to sealingly engage at least one of the sidewall or the peripheral rim of the container body;
    a first venting aperture extending through the rigid central cover portion of the removable lid;
    a first latch movable between a latched position and an unlatched position; and
    the first latch including a gripping portion and a sealing portion, wherein the gripping portion is configured to grip the container body and removably secure the removable lid to the container body when the first latch occupies the latched position, and wherein the sealing portion is configured to cover the first venting aperture when the first latch occupies the latched position and uncover the first venting aperture when the first latch occupies the unlatched position,
    wherein the flexible sealing lip includes a wiper seal configured to slidably and sealingly engage an inner surface of the sidewall.

19. The storage container of claim 18, wherein the first latch is rotationally connected to the removable lid, and wherein the first latch is configured to rotate about a rotational axis offset inwardly from the peripheral rim of the container body when the removable lid is secured to the container body.

20. The storage container of claim 18, further comprising:
    a second latch movable between a latched position and an unlatched position;
    a second venting aperture extending through the rigid central cover portion of the removable lid;
    the second latch including a gripping portion and a sealing portion, wherein the gripping portion is configured to grip the peripheral rim of the container body and removably secure the removable lid to the container body when the second latch occupies the latched position, wherein the sealing portion is configured to cover and seal close the second venting aperture when the latch occupies the latched position and uncover the venting aperture when the latch occupies the unlatched position; and
    wherein the first and second latches are arranged on opposite sides of the storage container.

* * * * *